Dec. 31, 1968   L. J. HRUSOVSKY   3,419,260
WEAR RESISTANT LEAF SPRING
Filed June 5, 1967
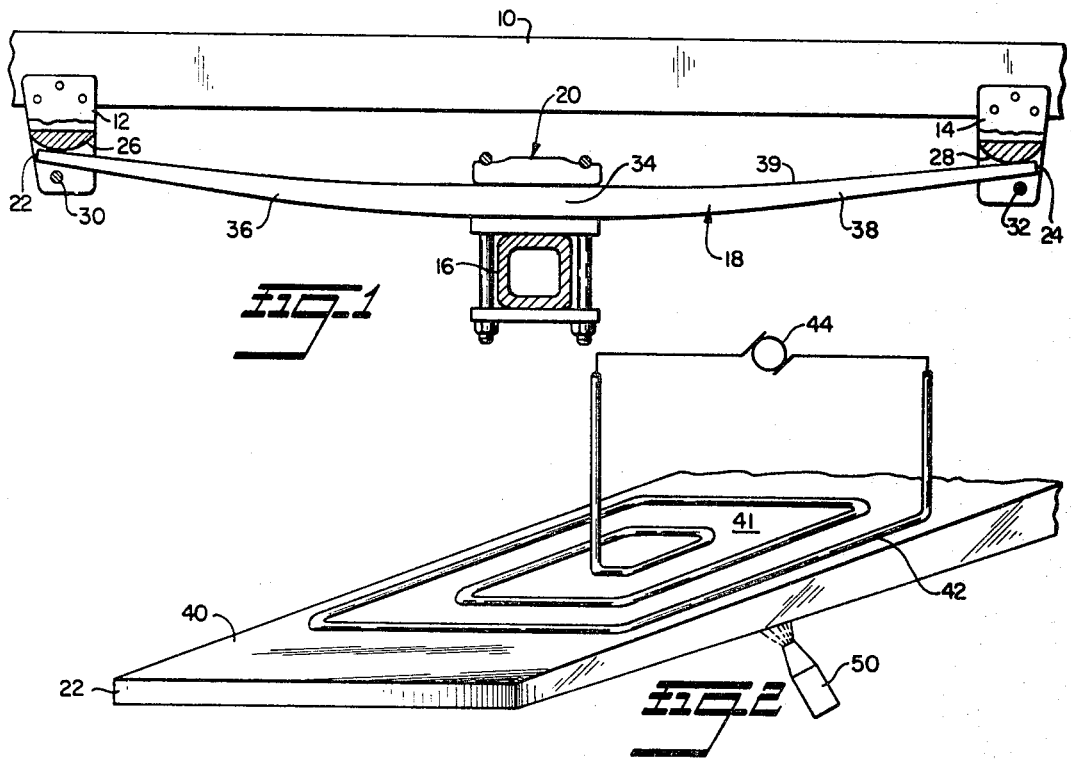
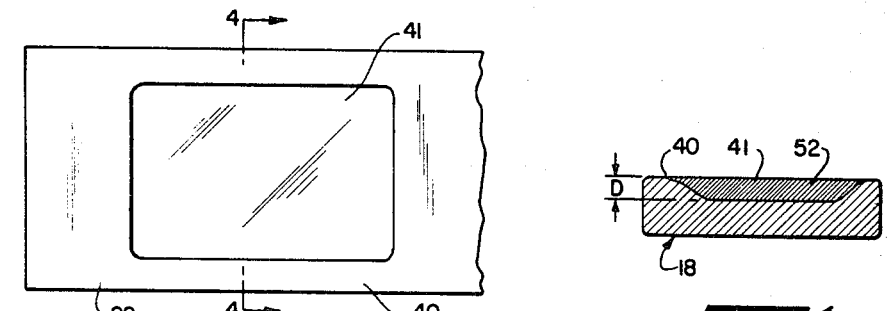
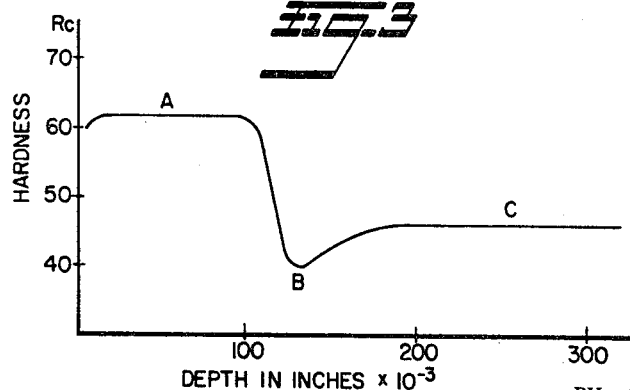
INVENTOR
LOUIS J. HRUSOVSKY
BY Strauch, Nolan, Neale, Nies & Kurz
ATTORNEYS

United States Patent Office 3,419,260
Patented Dec. 31, 1968

3,419,260
WEAR RESISTANT LEAF SPRING
Louis J. Hrusovsky, Bloomfield Hills, Mich., assignor to North American Rockwell Corporation, a corporation of Delaware
Continuation-in-part of application Ser. No. 566,968, July 21, 1966. This application June 5, 1967, Ser. No. 643,558
5 Claims. (Cl. 267—47)

ABSTRACT OF THE DISCLOSURE

A vehicle spring leaf having desirable spring characteristics and having a central mounting section and opposite ends adapted for sliding bearing engagement with hard wear surfaces on a vehicle frame has at one side localized surface regions extending across the width of that one side at the spring leaf ends for engagement with the wear surfaces with a central limited width portion only of each of the surfaces regions hardened to a limited predetermined depth to provide surface wear resistance without adversely affecting the desirable spring characteristics of the remainder of the spring leaf including the edge portions of the surface regions and the opposite side of the spring leaf.

BACKGROUND AND SUMMARY OF INVENTION

This invention refers to leaf springs for vehicle suspensions and more particularly to leaf springs of increased wear resistance at their slidingly mounted ends and an improved method of making spring leaves. This is a continuation-in-part of my copending application Ser. No. 566,968 filed July 21, 1966 for Wear Resistant Leaf Spring and Method.

This is accomplished in the invention by controllably hardening by heat treating localized areas of the otherwise finished leaf spring which are subject to sliding, abrasive and like wear.

In vehicle leaf spring suspensions of the cantilever supported type, that is, in which the ends of the leaf spring are slidingly mounted in frame brackets, a constant source of difficulty is that abrasive wear occurs between the leaf spring ends and the associated bracket surfaces, often resulting in premature failure. Although efforts have been made to counteract this difficulty by installation of hardened wear plates or buttons in the spring brackets such did not eliminate the wear effect on the leaf spring ends themselves. This steady wear at the spring ends caused by sliding and rebound on the associated wear surfaces of the spring brackets gradually destroys the surface of the leaf spring and impairs the metal structure often causing undesirably rapid failure in normal operation.

The invention provides a method of locally increasing the initial hardness of a previously heat treated and tempered leaf spring at areas subject to abrasive wear by heat hardening only these particular surface areas to a desired depth rapidly so that the adjoining areas will not be affected by the hardening. It is not desired to deep or through harden these wear areas of the leaf spring since in that case undesired tensile stresses will be built up in the longitudinal crosssection of the leaf where the higher hardness material changes to the lower hardness material which would cause early failure at these points. It is not desirable to harden the entire spring because that would adversely change the spring characteristics.

The invention also provides novel means to locally harden selected areas of a spring leaf to a depth ranging from 0.050″ to 0.250″ below the spring surface without detrimentally affecting the remainder of the spring leaf.

This is accomplished by intensely heating the selected area speedily at a fixed rate and accompanied by controlled chilling to localize the heated zone.

The invention also includes the novel leaf spring structure attained thereby.

It is a major object of the invention to provide a novel leaf spring of improved wear resistance wherein localized zones of the spring are hardened without changing the spring characteristics, and the novel method of making this spring leaf.

Another object of the invention is to provide a novel wear resistant leaf spring wherein localized zones of controlled depth with respect to spring surfaces subject to sliding wear are hardened preferably to approximately 58 to 64 Rockwell C as by induction heating with the heated zone controlled in extent by associated chilling.

It is a further object of the invention to provide a novel tempered spring leaf having localized areas adjacent its ends appreciably hardened to a controlled depth below the surface of the spring ranging from 0.050″ to 0.250″.

The invention will be better understood by reference to the following detailed description in connection with the appended drawings forming part thereof and in which:

Brief description of drawings

FIGURE 1 is a side elevation partly in section showing a vehicle leaf spring suspension in which the invention is advantageously employed;

FIGURE 2 is an enlarged fragmentary view that shows one form of a heating and quenching method and apparatus applied to an end of the spring leaf;

FIGURE 3 is a plan view of the heat treated leaf spring end of FIGURE 2 showing the approximate hardened wear area produced by the invention;

FIGURE 4 is a cross-section substantially on line 4—4 of FIGURE 3 through the hardened wear zone of the leaf spring end; and FIGURE 5 is a graphic presentation showing hardness variations produced in one spring end by the invention.

Preferred embodiments

FIGURE 1 shows a representative vehicle suspension arrangement comprising a vehicle longitudinal side frame member 10 from which depend rigid spaced hanger brackets 12 and 14. Suspended beneath frame 10 is a transverse axle 16 which is resiliently connected to the frame at each side by a leaf spring 18 fixedly attached to the axle as by a bolster plate and U-clamp assembly 20. The ends 22 and 24 of each leaf spring 18 are in sliding support contact with wear plates 26 and 28 within brackets 12 and 14 to thus operatively connect the axle 16 with vehicle frame 10. Rebound movement of the leaf spring ends is limited by pins 30 and 32 fixed in brackets 12 and 14 a small distance below the wear plates 26 and 28.

Leaf spring 18, which may be a single leaf or the load transmitting leaf in a multi-leaf assembly, is made of spring steel usually employed in making leaf springs, such as chromium or chromium-molybdenum steel. The preferred steels are heat treatable steels such as the chromium-molybdenum steel in the AISI 4100 group and the chromium steel in the AISI 5100 group, as well as the carbon steel in the AISI 1040–1045 group. In the present instance the leaf spring 18 may be a single tapered leaf spring produced according to the method disclosed in United States Patent No. 3,238,072 to R. R. Greene et al. This method includes such steps as taper rolling and grinding the tension side of the leaf as well as stress peening and proper heat treatment including tempering to provide a high quality spring leaf having a central portion 34 of maximum thickness from which extend tapered portions 36 and 38 of gradually decreasing thickness towards both ends. The invention is however, applicable to any leaf spring.

Although stress peening of the tension side 39 of the leaf spring as disclosed in the above noted United States patent considerably improves the tension surface quality of the leaf spring by introducing beneficial residual tensile stresses, it does not materially increase the wear resistance of the tension surface. The usual steel leaf spring so made is tempered after quenching to relieve deleterious residual tensile stress and improve toughness set up during the through quenching operation. This tempering produces a relatively uniform hardness of about 42 to 47 Rockwell C scale throughout the finished spring. This hardness is generally found to produce optimum fatigue life for a vehicle leaf spring and it desirably should be retained as much as possible. However, a greater hardness is required to materially reduce the abrasive wear at the spring ends. It would be highly detrimental to the fatigue life of the spring leaf to merely provide hardness throughout the leaf sufficiently high to withstand the abrasive wear. The invention provides the required hardness at the wear areas without adversely affecting the spring quality.

This is preferably accomplished in the present invention in the following manner: FIGURE 2 shows the spring leaf end 22 wherein the upper surface region at 40 which is in sliding rocking metal to metal contact with bracket wear plate 26 is subject to wear. To increase the hardness at this region a defined surface area 41 is locally heated as by means of a shaped induction heating coil 42 of proper size at a predetermined rate to a temperature sufficient to austenitize the material at such area 41 to the desired depth and immediately quenched. As shown in FIGURE 3, hardened area 41 extends only across a central limited width portion of the surface region 40 between relatively nonhardened edge portions. The heating rate, that is, the time duration and power of the induction coil, is selected such that through hardening of the leaf spring end is prevented, thereby preventing formation of residual tensile stresses associated with through hardening. In practice, the time and area subjected to heating are such that the metal is heated only through to a controlled depth ranging from about 0.050″ to 0.250″, of the spring leaf down from surface 40 at area 41 as indicated in FIGURE 4.

In a representative example, the spring leaf 18 may be placed on a traversing fixture (not shown) and scanned beneath a contour semi-coaxial induction coil 42 in the form of a pancake coil comprising a plurality of spiral turns of copper tubing which may also contain the usual cooling fluid. The terminals of the coil are connected in the output circuit of a high frequency power source 44 as by conductors 46 and 48. The power input in a working embodiment is about 50 kilowatts at 10,000 cycles and the scanning rate with which a chrome steel spring end 22 was moved beneath the coil 42 and ½ inch per second to quickly heat the wear area 41 to the desired depth. The power input and scanning rate can of course be varied to suit any particular size of leaf spring. The shape of the coil shown in the drawing as being rectangular may also be varied as to round, oval or other shapes depending on the desired area 41 to be heated.

Chilling control can be accomplished in any known manner such as by heat sink of the back-up material, or by a solution of polyvinyl alcohol and water spray directed on the non-heated underside of the spring leaf during scanning as indicated at 50 in FIGURE 2. By chilling the opposite side of the leaf with the spray 50 during the heating step, effective isolation of the hardening heat to zone 52 is accomplished. This method is preferable in that it prevents a material drawing effect, that is, an appreciable decrease in original hardness of the tempered spring below that of the intentionally hardened zone.

FIGURE 4 which is a random transverse cross-section through the hardened wear area 41 illustrates the depth penetration of the heating effect and the depth of the hardened zone 52 in accord with the present novel method. The hardened zones 52 as shown, penetrates to note more than approximately 0.250″ beneath the bearing surface of the spring, which has been found to be sufficient in most cases and desirable in order to generate beneficial residual compressive stresses on the surface that aid in reducing fretting corrosion. Hardening to a greater depth, or through hardening, would produce deleterious residual tensile stresses on the surface, which, of course, is undesired.

While spring 18 is disclosed herein as hardened on the tension side, the invention is not so limited and includes the hardening of the spring on either or both sides where subject to wear.

Microscopic examination of the hardened zone 52 reveals that the original microstructure of the tempered spring leaf which was tempered martensite was transformed in the hardened zone 52 to a martensitic microstructure consisting of martensite, bainite and ferrite with a decarburized upper surface. The sub-surface of the hardened zone consists largely of martensite with a trace of bainite. The decarb characteristic on the surface may vary slightly in accordance with the manufacturing methods employed. This, however, is of no influence on the result obtained by the present invention.

Wear resistance of sliding contacts is proportioned to hardness with the least amount of abrasive wear occurring at high hardness levels. The highest hardness obtainable in steel quenched from the austenitic condition is a function of its carbon content and reaches about $R_c$ 65 at 0.05% carbon. (Reference: Williams, Gordon T. "What Steel Shall I Use," American Society for Metals, 1941, p. 69.)

A hardness of 65 $R_c$ was achieved at induction heat treated areas; in addition, high magnitude residual compressive stresses beneficial to improved corrosive wear and fatigue properties were generated in the treated area.

It has been found that a desired hardness range for the hardened wear area 41 lies between about 57 to 65 Rockwell C which has been found to produce a wear resistance about eight times better than the wear resistance of the original 40 to 45 $R_c$ hardness of the spring leaf at that area.

As indicated in the graph in FIGURE 5 which was constructed by making actual hardness measurements in a sample leaf spring treated according to the invention along a vertical axis through the wear zone area, it can be seen that the curve portion A for the hardened zone 52 shows a substantially uniform hardness obtained throughout at better than 60 Rockwell C which at the end of the hardened zone abruptly falls off at B to somewhat below that of the original hardness of from 40 to 50 $R_c$ of the main portion C of the spring leaf. This represents a zone 52 having a hardness approximately 35% greater than the rest of the spring leaf. The drop in hardness at B immediately below the hardened zone is caused, as mentioned before, by the drawing effect during heating. However, this is negligible and can be mainly prevented by directing a stream of cooling water on the underside of the leaf spring as shown in FIGURE 2. A stress measurement taken at a depth of 0.010 inch below the surface in the hardened area revealed a beneficial residual compressive stress pattern extending to a depth of 0.057 in. was developed by induction hardening the wear pad area. The maximum surface residual compressive stress achieved was 81 K s.i.

In applications where severe impact loading causes brittle failure of the hardened layer, characterized by pitting and chipping of the layer, some resistance to wear may be sacrificed by tempering or stress relieving to improve toughness.

For example, tempering at 425° F. reduced hardness from the original 65 $R_c$ and the residual compressive stress from 88 K s.i. to 60 K s.i. Some resistance to abrasive and corrosion wear is lost but impact strength is improved.

Thus, the invention provides a novel method of effectively hardening one or more selected localized areas of a leaf spring to a desired depth to form a substantially uniform hardness zone of controlled depth at that area without detrimentally affecting the remainder of the leaf spring, so that wear resistance at this area will be substantially increased and the useful spring life lengthened.

While the spring 18 has its hardened wear areas at upper surfaces, the invention of course is equally applicable to springs which have their ends supported from below on wear surfaces, such as the springs disclosed in Bixby patent No. 2,999,695.

What is claimed is:

1. A vehicle spring leaf having desirable spring characteristics and having a central mounting section and opposite ends adapted for sliding bearing engagement with hard wear surfaces on a vehicle frame, said spring leaf having at one side localized surface regions extending across the width of said one side at said ends for said engagement with said wear surfaces, a central limited width portion only of each of said surface regions being hardened to a limited predetermined depth to provide bearing surface wear resistance without adversely affecting the desirable spring characteristics of the remainder of said spring leaf including the edge portions of said surface regions and the opposite side of said spring leaf.

2. The vehicle spring leaf defined in claim 1, wherein said hardened zones extend into the leaf for not more than 0.250" below the surfaces of the spring.

3. The vehicle spring leaf defined in claim 1, wherein said zones are approximately 35% to 50% harder than the remainder of the leaf.

4. The vehicle spring leaf defined in claim 2, wherein said zones have a hardness of about 58-64 Rockwell C with the remainder of the leaf a lesser hardness.

5. The vehicle spring leaf defined in claim 1, wherein said spring leaf ends are tapered in gradually reducing cross-section from a thicker center section, and wherein said zones are formed on the side which is the tension surface of the spring in a suspension.

References Cited

UNITED STATES PATENTS

| | | | |
|---|---|---|---|
| 2,294,161 | 8/1942 | Crowe | 148—145 |
| 2,831,788 | 4/1958 | Bridge et al. | 148—150 |
| 2,935,433 | 5/1960 | Pribyl | 148—152 |
| 3,173,668 | 3/1965 | Giovinazzo | 267—56 |
| 3,233,915 | 2/1966 | Hamlet | 267—56 |
| 3,240,639 | 3/1966 | Lihl | 148—39 |

DRAYTON E. HOFFMAN, *Primary Examiner.*

U.S. Cl. X.R.

267—1, 56